(12) United States Patent
Muraoka

(10) Patent No.: US 10,151,399 B2
(45) Date of Patent: Dec. 11, 2018

(54) SOLENOID VALVE DEVICE AND METHOD FOR MANUFACTURING THE SAME

(71) Applicant: NIDEC TOSOK CORPORATION, Zama, Kanagawa (JP)

(72) Inventor: Keiichiro Muraoka, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 1 day.

(21) Appl. No.: 15/295,140

(22) Filed: Oct. 17, 2016

(65) Prior Publication Data

US 2017/0114915 A1 Apr. 27, 2017

(30) Foreign Application Priority Data

Oct. 22, 2015 (JP) ................. 2015-208396

(51) Int. Cl.
| | | |
|---|---|---|
| *F16K 27/02* | (2006.01) | |
| *B29C 70/68* | (2006.01) | |
| *F16H 61/02* | (2006.01) | |
| *F16K 1/14* | (2006.01) | |
| *F16K 31/06* | (2006.01) | |
| *B29K 105/20* | (2006.01) | |
| *B29L 31/00* | (2006.01) | |

(52) U.S. Cl.
CPC .......... *F16K 27/029* (2013.01); *B29C 70/682* (2013.01); *F16H 61/0251* (2013.01); *F16K 1/14* (2013.01); *F16K 31/0665* (2013.01); *F16K 31/0675* (2013.01); *B29K 2105/20* (2013.01); *B29L 2031/7506* (2013.01)

(58) Field of Classification Search
CPC ............. F16K 31/0624; F16K 31/0627; F16K 31/0631; F16K 31/0665; F16K 31/0675; F16K 1/14; B29C 70/682; F16H 61/0251; B29K 2105/20; B29L 2031/7506
USPC ...................................... 251/129.15
See application file for complete search history.

(56) References Cited

U.S. PATENT DOCUMENTS 6,943,657 B2 * 9/2005 Subramanian ...... F16K 31/0637
251/129.15
7,049,916 B2 * 5/2006 Ryuen ................. F16K 31/0631
335/251
(Continued)

FOREIGN PATENT DOCUMENTS

JP H11173449 A 6/1999
JP 2003207069 A 7/2003
(Continued)

*Primary Examiner* — Ian Paquette
(74) *Attorney, Agent, or Firm* — Cantor Colburn LLP

(57) ABSTRACT

A solenoid valve device may include a rod pin; a cylindrical core comprising a magnetic material and arranged around the rod pin; a bobbin comprising resin and arranged to cover a side surface of the cylindrical core; a coil wound around the bobbin; a case comprising a bottom and being cylindrical and having an opening at one axial end thereof, and arranged to accommodate the rod pin, the cylindrical core, the bobbin, and the coil; a nozzle comprising resin and attached to a case opening portion defined at the one axial end of the case; a first a second port each defined in the nozzle; a valve body arranged in the nozzle, and structured to be driven by the rod pin to open or close a communication between the first and second ports; and a tubular metal cover arranged to cover a lateral surface of the nozzle.

9 Claims, 5 Drawing Sheets

(56) References Cited

U.S. PATENT DOCUMENTS

| | | | | |
|---|---|---|---|---|
| 7,650,906 B2* | 1/2010 | Nagasaki | ............ | F16K 27/0245 |
| | | | | 137/596.17 |
| 7,673,597 B2* | 3/2010 | Najmolhoda | ........... | B03C 1/286 |
| | | | | 123/90.12 |
| 8,925,582 B2* | 1/2015 | Lee | ......................... | F01L 13/00 |
| | | | | 137/596.17 |
| 9,052,723 B2* | 6/2015 | Mayr | ................. | G05D 16/2013 |
| 2015/0102243 A1* | 4/2015 | Timmermans | ........ | F16K 27/029 |
| | | | | 251/129.07 |
| 2015/0345655 A1* | 12/2015 | Higashidozono | ... | F04B 27/1804 |
| | | | | 137/624.27 |

FOREIGN PATENT DOCUMENTS

| | | |
|---|---|---|
| JP | 2003262285 A | 9/2003 |
| JP | 2006057824 A | 3/2006 |

* cited by examiner

SOLENOID VALVE DEVICE AND METHOD FOR MANUFACTURING THE SAME

CROSS REFERENCE TO RELATED APPLICATIONS

The present application claims priority under 35 U.S.C. § 119 to Japanese Application No. 2015-208396, filed Oct. 22, 2015, the entire content of which is incorporated herein by reference.

BACKGROUND

1. Field of the Invention

At least an embodiment of the present invention relates to a solenoid valve device used in, for example, an automatic transmission of a vehicle, and a method for manufacturing the same.

2. Description of the Related Art

A control valve is typically provided in an automatic transmission of a vehicle to control a transmission system. The control valve controls the transmission system by supplying a hydraulic pressure of a predetermined magnitude to the transmission system or stopping the supply using a solenoid valve device.

Such solenoid valve devices are described in, for example, JP-A 2003-207069 and JP-A 1999-173449. The solenoid valve device described in JP-A 2003-207069 is an on-off solenoid valve, and this solenoid valve device includes a nozzle in which a valve body is accommodated, and a solenoid to drive the valve body. The solenoid includes a cylindrical case, and a bobbin around which a coil is wound, a fixed core, and a rod pin arranged to reciprocate in a center of the coil are accommodated in the cylindrical case. In the solenoid valve device, the coil of the solenoid is energized to cause the rod pin to reciprocate, and a tip of the rod pin causes opening and closing of the valve body.

When a solenoid valve device is attached to a control valve, a nozzle with an O-ring fitted to an outer circumference thereof is typically fitted into an attachment hole, with the result that a gap between the nozzle and a wall surface of the attachment hole is sealed with the O-ring, as is the case with each of the solenoid valve devices described in JP-A 2003-207069 and JP-A 1999-173449. However, this related-art technique involves use of a sealing member made of a resin, such as the O-ring, and as the resin inevitably degrades due to aging, the sealing member needs to be periodically replaced in the case where the solenoid valve device is used for a long term, as when the solenoid valve device is used in a vehicle. For example, a sealing member made of a nylon resin, which is widely used, or the like may degrade as a result of the resin hydrolyzing by absorbing surrounding water.

Moreover, the sealing member is made of a resin softer than the materials of the solenoid valve device and the control valve, and it is therefore required to take great care, when fitting the nozzle of the solenoid valve device into the attachment hole of the control valve, to prevent the sealing member from making contact with an edge of the attachment hole and being damaged, which would result in a reduction in sealing performance. As a result, the operation of fitting the solenoid valve device may take much time.

Accordingly, a solenoid valve device as described below has been proposed. In this solenoid valve device, a nozzle is made of a metal, and accuracy with which a circumference of the nozzle is worked is accordingly improved to minimize a gap between the nozzle and the wall surface of the attachment hole, and thus, sufficient sealing performance is secured without use of a sealing member.

The solenoid valve device of this type has the advantage of freedom from a degradation of a sealing member due to aging, damage to a sealing member during fitting of the nozzle, and the like, but it is difficult to manufacture such a related-art solenoid valve device because the nozzle thereof is entirely made of a metal. In particular, in the solenoid valve device, it is necessary to arrange a movable valve body in the nozzle, and define hollow portions, such as an in-port, an out-port, and a valve chest, in the nozzle, and therefore, it is much more difficult to manufacture the nozzle entirely made of a metal than a nozzle made of a resin and involving use of a sealing member.

At least an embodiment of the present invention, for example, enables a solenoid valve device to be fixed to a control valve with excellent sealing performance with use of a nozzle made of a resin and without use of a sealing member such as an O-ring.

SUMMARY

A solenoid valve device according to an embodiment of the present invention includes:

(1) a rod pin movable in an axial direction;
(2) a cylindrical core made of a magnetic material, and arranged around the rod pin to guide the rod pin;
(3) a bobbin made of a resin, and arranged to cover a side surface of the cylindrical core;
(4) a coil wound around the bobbin;
(5) a case having a bottom and being cylindrical, having an opening at one axial end thereof, and arranged to accommodate the rod pin, the cylindrical core, the bobbin, and the coil;
(6) a nozzle made of a resin, and attached to a case opening portion defined at the one axial end of the case;
(7) a first port and a second port each of which is defined in the nozzle;
(8) a valve body arranged in the nozzle, and driven by the rod pin to open or close a communication between the first and second ports; and
(9) a tubular metal cover arranged to cover a lateral surface of the nozzle.

The solenoid valve device according to an embodiment of the present invention may have any of the following features.

(1) The metal cover is arranged to cover the entire lateral surface of the nozzle.

(2) At least one of the first and second ports is arranged to open in a side surface of the nozzle, the metal cover includes a cover opening portion defined at a position corresponding to a position of the port opening in the side surface of the nozzle, and a portion of the nozzle abuts against the cover opening portion.

(3) The cover opening portion is larger than a portion of the port that opens in the side surface of the nozzle, and a surface of the nozzle is exposed between an inner edge of the cover opening portion and a periphery of the opening portion of the port such that the surface of the nozzle is flush with a surface of the metal cover.

(4) The metal cover includes a recessed portion or a raised portion defined in an inner surface thereof, and a portion of the nozzle abuts against a portion of the metal cover through the recessed portion or the raised portion.

(5) The metal cover is defined by an aluminum pipe.

(6) The nozzle includes a pin receiving portion in which the rod pin is inserted at one axial end thereof, and the first port is arranged at another axial end of the nozzle, the first port extending in the axial direction;

a valve member having a valve body accommodated therein is arranged in a valve seat provided between the pin receiving portion and the first port, and the second port is arranged to extend radially from the valve member to the side surface of the nozzle; and a side surface of the metal cover includes an opening at a position corresponding to a position of the second port.

(7) Each of the pin receiving portion and the first port is arranged to decrease in a diameter from the axial end of the nozzle made of the resin toward an axial middle of the nozzle.

(8) The nozzle is to be fitted into an attachment hole defined in a control valve for attachment of the solenoid valve device, and the metal cover is arranged to close a gap between a wall surface of the attachment hole for the attachment of the solenoid valve and an outer circumferential surface of the nozzle made of the resin.

(9) According to an embodiment of the present invention, there is provided a method for manufacturing the solenoid valve device as described above, wherein the nozzle made of the resin is molded by an insert molding process with the metal cover as an insert.

According to an embodiment of the present invention, a solenoid unit and a nozzle unit defined by separate members are combined to form a solenoid valve device, and this makes it possible to combine various types of nozzle units with the solenoid unit, which is used in common, to easily form solenoid valve devices having various structures, for example.

The above and other features, elements, steps, characteristics and advantages of the present invention will become more apparent from the following detailed description of embodiments of the present invention with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

1. First Embodiment 1-1. Structure

Hereinafter, a first embodiment of the present invention will be described with reference to the accompanying drawings. In the present embodiment, an "axis" refers to a central axis extending along a longitudinal direction of an oil introducing portion, and a "circumferential direction" and an "axial direction" refer to a circumferential direction about the central axis and an axial direction of the central axis, respectively, unless otherwise noted.

Figure 1:
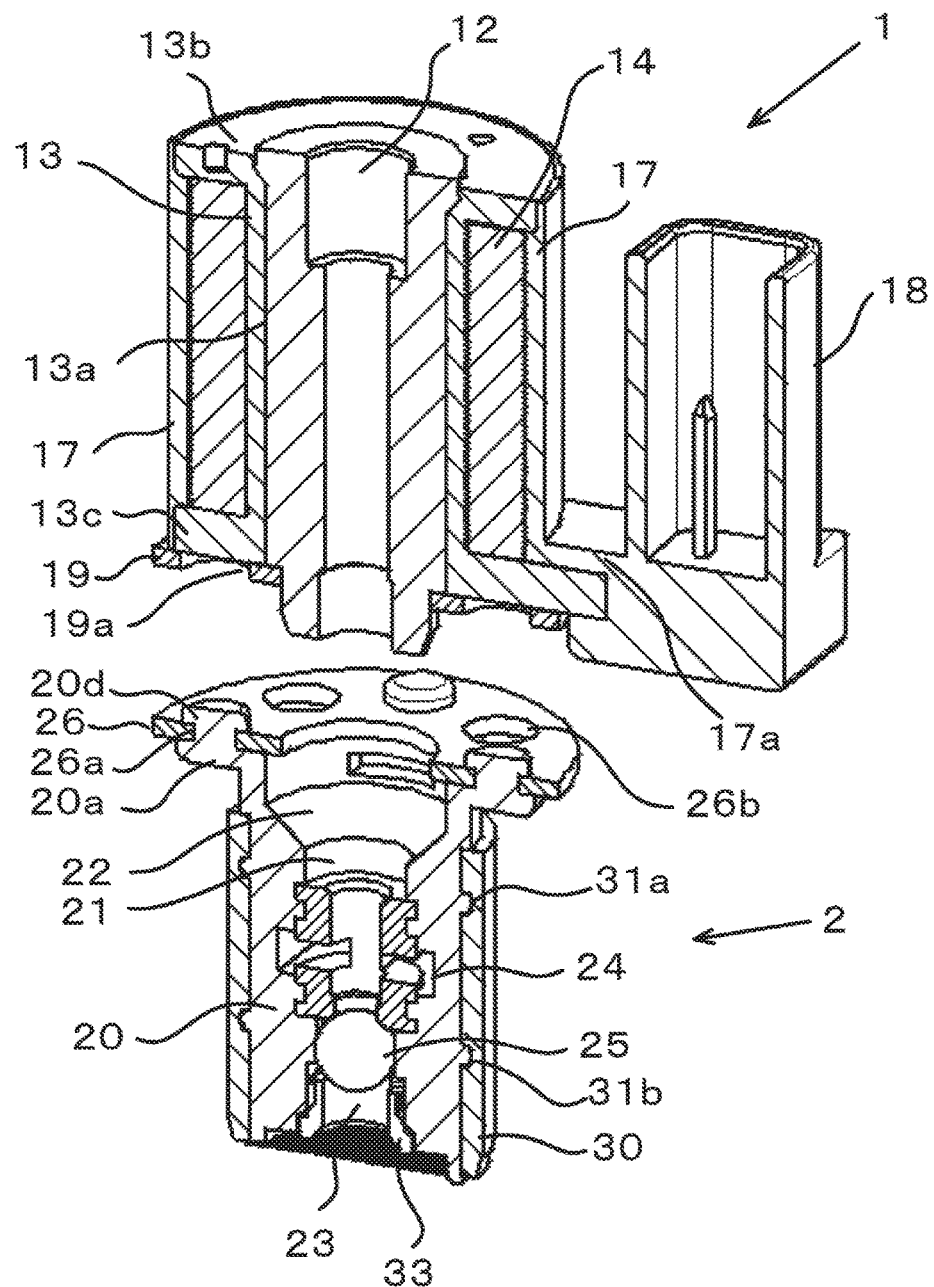
FIG. 1 is a perspective sectional view of a solenoid valve device according to a first embodiment of the present invention in a disassembled condition with a case removed therefrom when viewed obliquely from above.
Figure 2:
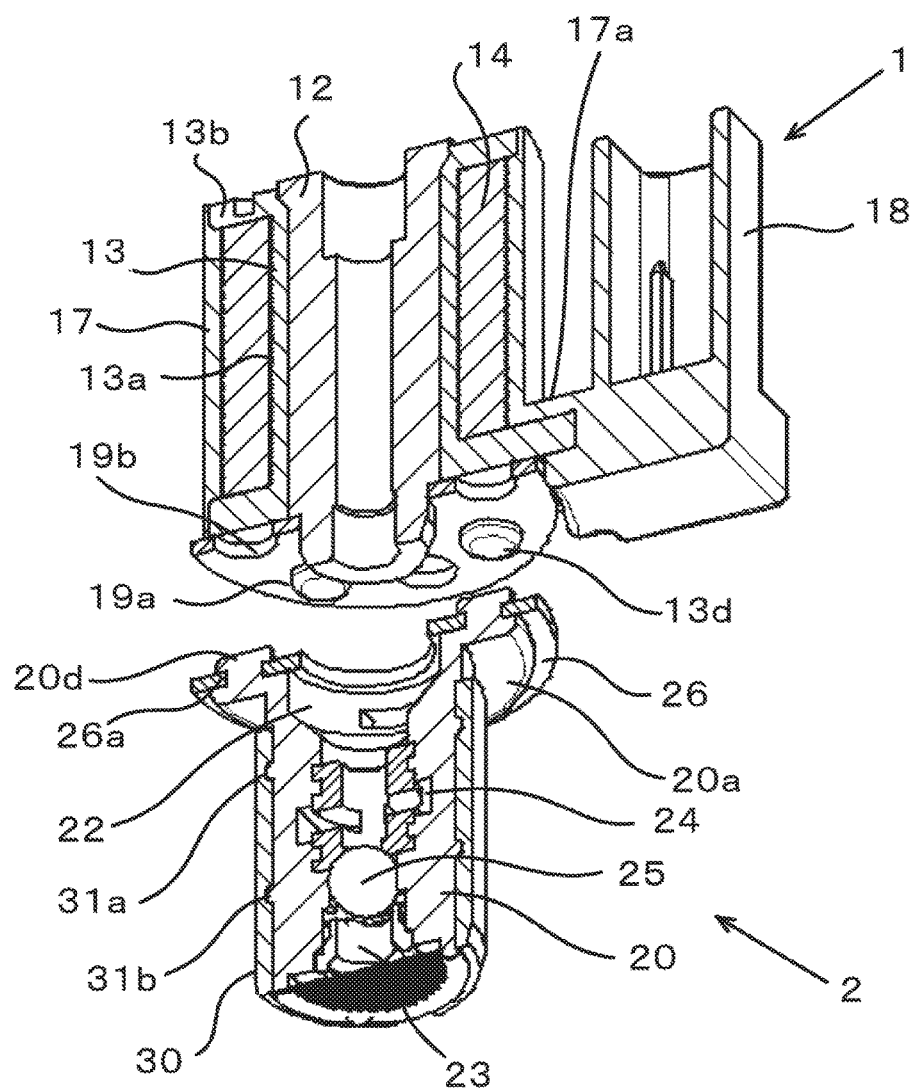
FIG. 2 is a perspective sectional view of the solenoid valve device according to the first embodiment of the present invention in the disassembled condition with the case removed therefrom when viewed obliquely from below.

A nozzle unit 2 according to the present embodiment is of a normally low type. That is, in a solenoid valve device according to the present embodiment, a valve is normally closed, and when the valve is opened, a high-pressure oil is outputted. As illustrated in FIGS. 1 and 2, the solenoid valve device according to the present embodiment is made up of a solenoid unit 1 and the nozzle unit 2, which are defined by separate members.

(1) Solenoid Unit

The solenoid unit 1 includes a case 10 having a bottom and being cylindrical, and having an opening at one axial end thereof. A rod pin 11 which is movable in the axial direction of the solenoid unit 1 is arranged in a center of the case 10. A first end portion of the rod pin 11 is arranged to project toward the nozzle unit 2 through an opening portion of the case 10, while a second end portion of the rod pin 11 is arranged to face a central portion of a bottom portion of the case 10.

A cylindrical core 12 made of a magnetic material is arranged around the rod pin 11, and the rod pin 11 is guided by the cylindrical core 12. A side surface of the cylindrical core 12 is covered with a bobbin 13 made of a resin, and a coil 14 is wound around an outer circumference of the bobbin 13. More specifically, the bobbin 13 includes a cylindrical portion 13a and flanges 13b and 13c arranged at both ends of the cylindrical portion 13a, and the coil 14 is wound around the cylindrical portion 13a. The flange 13b is arranged to face the bottom portion of the case 10, while the other flange 13c is arranged to close the opening portion of the case 10. End portions of the cylindrical core 12 and the rod pin 11, which are arranged inside of the bobbin 13, are arranged to project toward the nozzle unit 2 from the flange 13c and an edge of the opening portion of the case 10.

The rod pin 11, the cylindrical core 12, the bobbin 13, and the coil 14 are accommodated in the case 10. At the bottom portion of the case 10, a fixing disc 16 in the shape of a disk is arranged to face an end surface of the cylindrical core 12 and the flange 13a, and the second end portion of the rod pin 11 is fixed to a central portion of the fixing disc 16.

The outer circumference of the bobbin 13 and an outer circumference of the coil 14 are coated with a cylindrical molding member 17 arranged along an inner surface of the case 10. A connector 18, which is arranged outside of the case 10, is integrally molded with the molding member 17. More specifically, a cut 10a is defined at an end portion of the case 10 near the opening portion thereof, and a junction 17a of the molding member 17 and the connector 18 is positioned in the cut 10a to allow the molding member 17 and the connector 18, which are arranged one inside and the other outside of the case 10, to be joined to each other.

A second metal member as recited in the claims is fixed to a surface of the flange 13c which faces away from the case 10. In the present embodiment, the second metal member is a ring-shaped plate 19 fixed to an outer circumference of the cylindrical core 12. The plate 19 includes, in a central portion thereof, an opening portion in which the end portions of the rod pin 11 and the cylindrical core 12 on the side closer to the nozzle unit 2 are inserted, and the plate 19 has such an outside diameter that the plate 19 can be fitted to an inner circumference of the case 10.

The plate 19 includes a plurality of first holes 19a and a plurality of second holes 19b defined therein, and the first holes 19a and the second holes 19b are arranged alternately. A portion of the resin of the bobbin 13 penetrates through each first hole 19a, so that the plate 19 and the bobbin 13 are fixed to each other. A tip portion of the resin of the bobbin 13 arranged in each first hole 19a defines a projecting portion 13d arranged to project toward the nozzle unit 2 from a surface of the plate 19.

Arrangement of the resin of the bobbin 13 in each first hole 19a of the plate 19 can be achieved in the following manner. That is, the projecting portion 13d is defined on the surface of the flange 13c of the bobbin 13 when the bobbin 13 is molded, the projecting portion 13d is inserted into the first hole 19a, and a tip of the projecting portion 13d is thereafter subjected to heat welding, so that the plate 19 and the flange 13c are fixed to each other. Alternatively, the plate 19 and the bobbin 13 may be fixed to each other by molding the bobbin 13 by an insert molding process with the plate 19 as an insert.

At an inner circumference of the opening portion of the case 10, a shoulder portion 10b having a relatively small inside diameter on the side closer to the bottom of the case 10 and a relatively large outside diameter on the side closer to the opening portion of the case 10 is defined by making the thickness of an edge of the case 10 smaller than the thickness of a remaining portion of a cylindrical portion of the case 10. The shoulder portion 10b corresponds to an engagement portion as recited in the claims, and an outer circumferential portion of the plate 19 makes contact with the shoulder portion 10b to restrain the plate 19 from moving further into the case 10.

The portion of the opening portion of the case 10 which is reduced in thickness is arranged to have an axial dimension greater than the combined thickness of the plate 19 and a plate 26 of the nozzle unit 2, which will be described below. A portion of the opening portion of the case 10 which protrudes beyond the two plates 19 and 26 defines a crimping portion 10c which is bent to an interior of the case 10. The crimping portion 10c corresponds to a fixing portion as recited in the claims, and is arranged to fix the plate 26, which corresponds to a first metal member provided in the nozzle unit 2, between the shoulder portion 10b and the crimping portion 10c.

(2) Nozzle Unit

The nozzle unit 2 includes a substantially cylindrical nozzle 20 made of a resin and including an internal hollow portion 21. On the side closer to the solenoid unit 1, the nozzle 20 includes a pin receiving portion 22 in which the rod pin 11 is inserted, the pin receiving portion 22 being in communication with the hollow portion 21.

A first port 23 and a second port 24, each of which is in communication with the hollow portion 21, and a valve body 25, which is driven by the rod pin 11 to open or close a communication between the first port 23 and the second port 24, are accommodated in the nozzle 20. In the present embodiment, the first port 23 is an in-port, and the second port 24 is an out-port.

Figure 4:
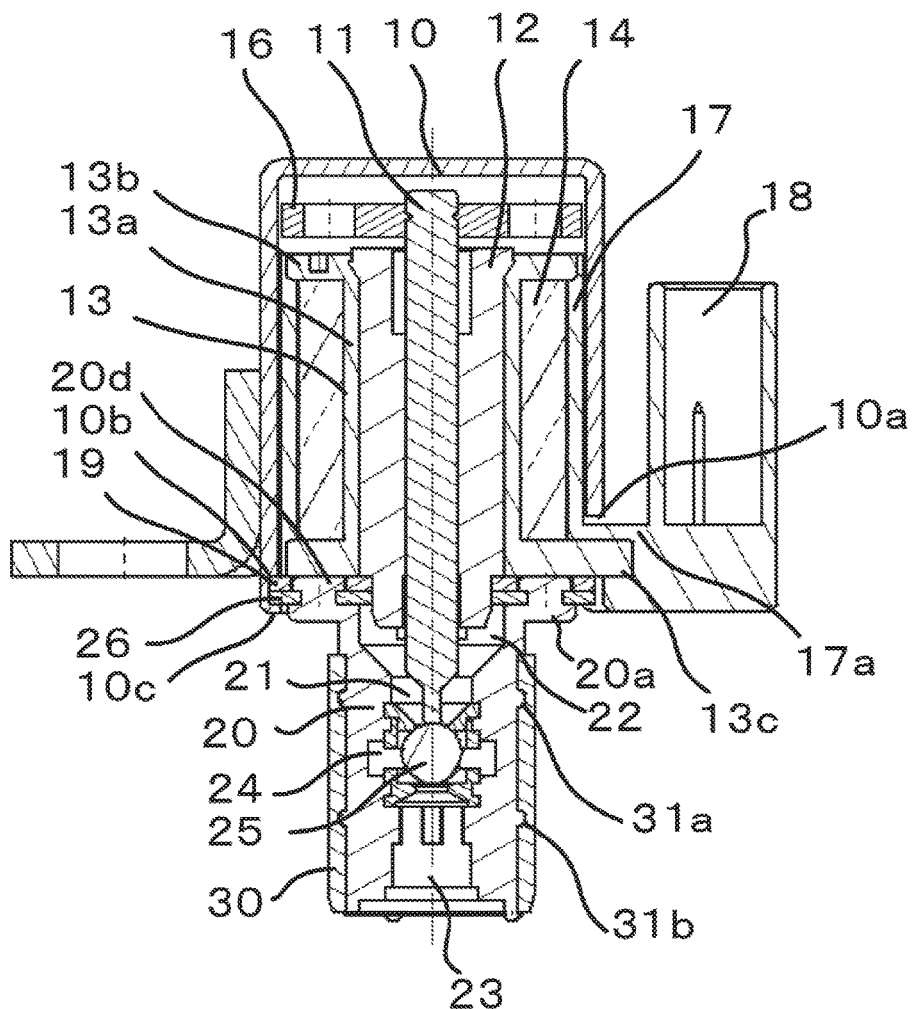
FIG. 4 is a sectional view of the solenoid valve device according to the first embodiment of the present invention in the assembled condition.

In the case of the normally low type as illustrated in FIG. 1, in order to arrange the valve body 25 in the hollow portion 21 inside of the resin, the valve body 25 is inserted into the first port 23 of the nozzle 20, and a resin cap 33 is thereafter fixed to the nozzle 20 through ultrasonic welding or heat welding to seal in the valve body 25. Note that, in the case of a normally high type as illustrated in FIG. 4, the nozzle 20 is molded by an insert molding process with a metal valve seat member having the valve body 25 accommodated therein as an insert to be arranged inside of the resin. In this case, in order to allow a mold to be easily separated from the nozzle 20 in the axial direction, each of the pin receiving portion 22 and the first port 23 is arranged to decrease in a diameter from an axial end of the nozzle 20 toward an axial middle of the nozzle 20.

At an end portion of the nozzle 20 near the pin receiving portion 22, a flange 20a is defined integrally with the nozzle 20, and the first metal member as recited in the claims is fixed to a surface of the flange 20a which faces the solenoid unit 1. In the present embodiment, the first metal member is the plate 26, which is in the shape of a ring and is fixed to a circumference of the pin receiving portion 22. The plate 26 includes, in a central portion thereof, an opening portion in which the end portions of the rod pin 11 and the cylindrical core 12 on the side closer to the nozzle unit 2 are inserted, and the plate 26 has such an outside diameter that the plate 26 can be fitted to the inner circumference of the case 10.

The plate 26 includes a plurality of first holes 26a and a plurality of second holes 26b defined therein, and the first holes 26a and the second holes 26b are arranged alternately. A portion of the resin of the nozzle 20 penetrates through each first hole 26a, so that the plate 26 and the nozzle 20 are fixed to each other. A tip portion of the resin of the nozzle 20 arranged in each first hole 26a defines a projecting portion 20d arranged to project toward the solenoid unit 1 from a surface of the plate 26. Fixing of the plate 26 to the nozzle 20 such that the resin of the nozzle 20 is arranged in each first hole 26a can be accomplished in the following manner, as is similarly the case with the plate 19. That is, a tip of the projecting portion 20d inserted in the first hole 26a is subjected to heat welding, or the nozzle 20 is molded by an insert molding process with the plate 26 as an insert.

The first holes 19a and 26a and the second holes 19b and 26b defined in the two plates 19 and 26 have the following positional relationship. That is, the projecting portion 20d projecting from each first hole 26a in the plate 26 of the nozzle unit 2 is fitted into a corresponding one of the second holes 19b in the plate 19 of the solenoid unit 1, whereas the projecting portion 13d projecting from each first hole 19a in the plate 19 of the solenoid unit 1 is fitted into a corresponding one of the second holes 26b in the plate 26 of the nozzle unit 2.

In the present embodiment, a cylindrical metal cover 30 is arranged on an outer circumferential surface of the nozzle 20. The metal cover 30 is defined by, for example, an aluminum pipe, and is arranged to have such an outside diameter that the metal cover 30 can be fitted in an attachment hole defined in a control valve for attachment of the solenoid valve device without a gap. The metal cover 30 is arranged to cover an entire lateral surface of the nozzle 20, that is, the entire circumferential and axial extents of the nozzle 20.

The metal cover 30 is fixed to the nozzle 20 by insert molding when the nozzle 20 made of the resin is produced. An inner circumferential surface of the metal cover 30 includes, for example, two recessed portions 31a and 31b each of which extends in the circumferential direction, and a portion of the resin of the nozzle 20 enters into each of the recessed portions 31a and 31b, so that the metal cover 30 is fixed to the nozzle 20 so as not to be detached therefrom.

The metal cover 30 includes a cover opening portion 32 defined at a position corresponding to the position of the second port 24 of the nozzle 20, the cover opening portion 32 being slightly larger than the second port 24. More specifically, the cover opening portion 32 is larger than an opening portion of the second port 24, and a surface of the nozzle 20 is exposed between an inner edge of the cover opening portion 32 and a periphery of the opening portion of the second port 24 such that the surface of the nozzle 20 is flush with a surface of the metal cover 30.

Figure 6:
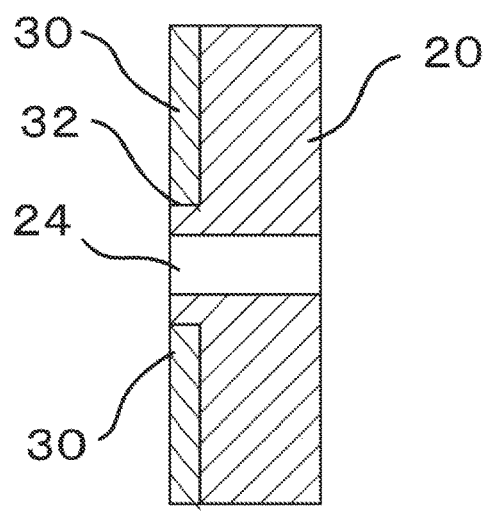
FIG. 6 is an enlarged sectional view illustrating a cover opening portion and a port portion of a nozzle according to the first embodiment of the present invention.

When the nozzle 20 is molded by an insert molding process with the metal cover 30 as an insert, a portion of the resin of the nozzle 20 flows into an inner circumference of the cover opening portion 32 and is cured, so that a portion of the nozzle 20 around the second port 24 and the cover opening portion 32 of the metal cover 30 abut against each other as illustrated in FIG. 6 to restrain the metal cover 30 from moving in the circumferential direction or in the axial direction relative to the nozzle 20, in conjunction with the recessed portions 31a and 31b.

1-2. Beneficial Effects

Figure 3:
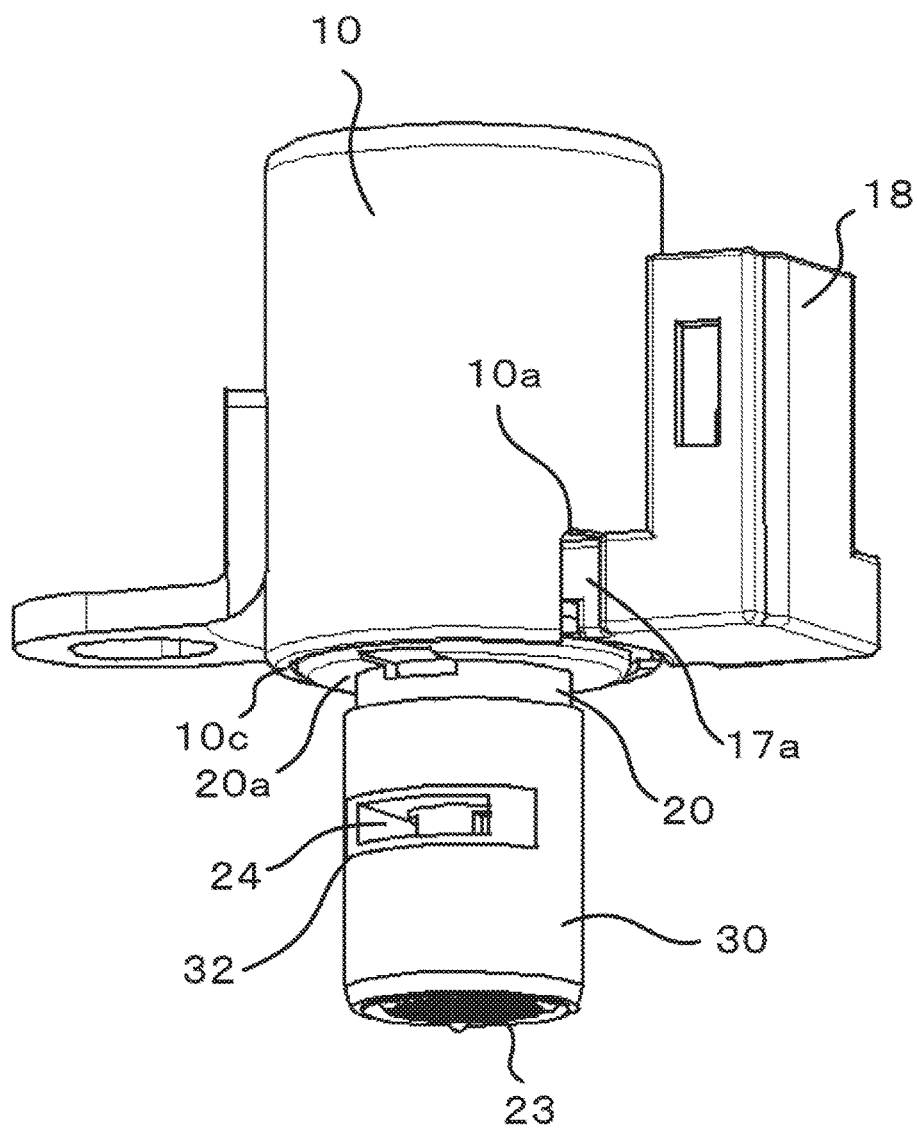
FIG. 3 is a perspective view of the solenoid valve device according to the first embodiment of the present invention in an assembled condition when viewed obliquely from below.

As illustrated in FIGS. 1 and 2, in order to manufacture the solenoid valve device according to the present embodiment, the solenoid unit 1 and the nozzle unit 2 are first assembled separately. Thereafter, the plate 19 of the solenoid unit 1 and the plate 26 of the nozzle unit 2 are placed one upon the other to join the solenoid unit 1 and the nozzle unit 2 to each other as illustrated in FIGS. 3 and 4. More specifically, as illustrated in FIG. 3, the end portions of the rod pin 11 and the core 12 are passed through the central opening portion of the plate 26 to fit the plate 26 inside of the opening portion of the case 10, so that the two plates 19 and 26 are placed one upon the other.

In this case, since the projecting portions 13d of the bobbin 13 made of the resin project from the surface of the plate 19 of the solenoid unit 1, the projecting portions 13d are fitted into the second holes 26b defined in the plate 26 of the nozzle unit 2. At the same time, the projecting portions 20d of the nozzle 20 made of the resin, which project from the surface of the plate 26 of the nozzle unit 21, are fitted into the second holes 19b defined in the plate 19 of the solenoid unit 1. As a result, circumferential movement of the two plates 19 and 26 relative to each other is restrained, so that the solenoid unit 1 and the nozzle unit 2 are circumferentially positioned relative to each other.

Figure 5:
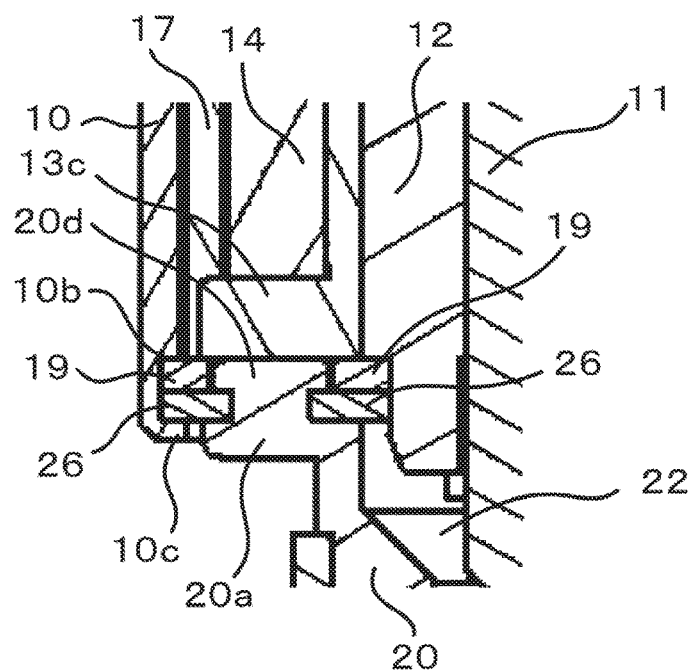
FIG. 5 is an enlarged sectional view illustrating a crimping portion according to the first embodiment of the present invention.

As illustrated in FIG. 5, in this situation, a circumference of the plate 19 makes contact with the shoulder portion 10b defined in the inner circumference of the case 10, and therefore, the two plates 19 and 26 and the nozzle unit 2 including the plate 26 fixed therein do not move further toward the bottom portion of the case 10. Meanwhile, the portion of the opening portion of the case 10 which is reduced in thickness includes the crimping portion 10c which protrudes toward the nozzle unit 2 beyond the two plates 19 and 26 placed one upon the other, and this crimping portion 10c is bent to the interior of the case 10, so that the plates 19 and 26 are tightly held between the crimping portion 10c and the shoulder portion 10b. As a result, the solenoid unit 1 and the nozzle unit 2 are securely fixed to each other by the crimping process performed on the case 10, which is made of a metal.

The solenoid valve device manufactured in the above-described manner is attached to the control valve, which is provided in a transmission, by fitting the nozzle unit 2 into the attachment hole defined in the control valve. In this case, because the cylindrical metal cover 30 is arranged on the outer circumferential surface of the nozzle 20, and the metal cover 30 has such an outside diameter that the metal cover 30 can be fitted in the attachment hole defined in the control valve for the attachment of the solenoid valve device without a gap, a wall surface of the attachment hole and an outer circumference of the metal cover 30 are brought into close contact with each other to ensure sufficient sealing therebetween to prevent a leakage of a hydraulic oil through an area where the solenoid valve device is fitted in the attachment hole.

(1) According to the present embodiment, the nozzle 20 is made of a resin, and can therefore be produced more easily than a nozzle that is entirely made of a metal, although the nozzle 20 has a complicated shape, having the plurality of ports and the internal valve body.

(2) According to the present embodiment, the sealing between the nozzle unit 2 and the wall surface of the attachment hole defined in the control valve can be achieved with the metal cover 30, which surrounds the nozzle 20 made of a resin, fitted to the control valve, which is made of a metal, without use of a sealing member such as, for example, an O-ring. This allows a region where the solenoid valve device is fitted to the control valve to have great durability, and prevents damage to sealing performance of the above fitting region, as there is no possibility that damage to a sealing member will occur during fitting of the nozzle.

(3) According to the present embodiment, the metal cover 30 is made of aluminum, which is relatively soft among metals, and the metal cover 30 can therefore be inserted smoothly into the attachment hole defined in the control valve, and an outer circumferential surface of the metal cover 30 and the wall surface of the attachment hole are well fitted to each other to ensure excellent sealing therebetween.

(4) According to the present embodiment, the metal cover 30 is arranged to cover the entire axial extent of the nozzle 20, and this makes the area of contact between the metal cover 30 and the wall surface of the attachment hole of the control valve large, resulting in excellent sealing therebetween.

(5) According to the present embodiment, a raised portion or the recessed portions 31a and 31b are defined in an inner circumference of the metal cover 30 to securely join the metal cover 30 and the nozzle 20 to each other even when the metal cover 30 and the nozzle 20 are fixed to each other by insert molding. Thus, a vibration of the control valve or of the solenoid valve device would not cause the metal cover 30 and the nozzle 20 to be detached from each other, or cause the solenoid valve device to be displaced with respect to the control valve. In particular, the metal cover 30 and the nozzle 20 made of the resin have different coefficients of thermal expansion, and therefore, simply fitting the nozzle 20 into the metal cover 30 might permit a change in temperature to cause a gap therebetween, but provision of the raised portion(s) or the recessed portion(s) increases the strength with which the metal cover 30 and the nozzle 20 are attached to each other, making a change in temperature less likely to produce an unfavorable effect.

(6) According to the present embodiment, the cover opening portion 32 surrounding the port 24 opening in a side surface of the nozzle 20 is defined in the metal cover 30, and the resin around the port 24 is exposed at the inner edge of the cover opening portion 32. Therefore, a portion of the resin of the nozzle 20 and a portion of the metal cover 30 abut against each other, so that the metal cover 30 is restrained from moving in the circumferential direction or in the axial direction relative to the nozzle 20.

(7) According to the present embodiment, each of the pin receiving portion 22 and the first port 23 is arranged to decrease in the diameter from the axial end of the nozzle 20 toward the axial middle of the nozzle 20, and this makes it easy to remove the mold in the axial direction after the nozzle 20 is molded by the insert molding process with the metal cover 30 as the insert, allowing a simple mold structure.

(8) According to the present embodiment, the solenoid unit 1 and the nozzle unit 2, which are defined by separate members, are combined to form the solenoid valve device, and this makes it possible to prepare a plurality of types of nozzle units 2 having nozzles with different outside diameters, as attachment holes defined in control valves vary in diameter, and combine an appropriate one of the nozzle units 2 with the common solenoid unit 1 to easily form a solenoid valve device suited to the target attachment hole, which may vary in diameter.

2. Other Embodiments

The present invention is not limited to the above-described embodiments. The above-described embodiments have been presented by way of example only, and may be embodied in a variety of other forms. Various omissions, substitutions, and changes may be made without departing from the scope of the invention. These embodiments and modifications thereof fall within the scope and spirit of the invention and the scope of equivalents thereof. Examples thereof will now be described below.

(1) Although the solenoid valve device according to the embodiment illustrated in the accompanying drawings is made up of the combination of the solenoid unit 1 and the nozzle unit 2, in a solenoid valve device according to another embodiment of the present invention, a bobbin and a nozzle may be integrally defined using a resin, as is the case with a solenoid valve device described in JP-A 2003-207069 and a solenoid valve device described in JP-A 1999-173449. The two separate plates 19 and 26 need not be provided, and only one plate used as an insert in an insert molding process may be provided within the resin.

(2) Although, in the above-described embodiment, the cover opening portion larger than the port opening in the side surface of the nozzle is defined in the metal cover, the cover opening portion may alternatively be the same in size and shape as the opening portion of the port, with no portion of the resin of the nozzle being exposed through the cover opening portion, if a portion of the metal cover and a portion of the nozzle are arranged to abut against each other at another position.

(3) The metal cover may not necessarily be arranged to cover the entire side surface of the nozzle, that is, the entire axial extent of the nozzle, but may alternatively be cylindrical and cover only a portion of the axial extent of the side surface of the nozzle. The metal cover is arranged to have at least such an axial dimension that the area of contact between the metal cover and the wall surface of the attachment hole defined in the control valve is sufficiently large to prevent a leakage of an oil flowing in the control valve and the solenoid valve device.

(4) An axially upper end or lower end of the metal cover may be bent inward, and the nozzle may be molded by an insert molding process with the resulting bend portion of the metal cover inserted into the resin of the nozzle so that a portion of the metal cover and a portion of the nozzle can make contact with each other to prevent axial movement of the metal cover and the nozzle relative to each other. Alternatively, a middle portion of the metal cover may be cut and bent inward to define a raised portion, and the nozzle may be molded by an insert molding process with the raised portion inserted into the resin of the nozzle.

(5) The material of the metal cover 30 is not limited to aluminum, but stainless steel or any other desirable metal may alternatively be used as the material of the metal cover 30. Also, the material of the metal cover 30 is not limited to a pipe, but the metal cover 30 may alternatively be cut out of a block material by a cutting process.

(6) In the case where any port opens in the side surface of the nozzle, the metal cover may be arranged to avoid an opening portion of the port.

(7) In a solenoid valve device according to an embodiment of the present invention, a solenoid portion and a valve may have any structure as long as the solenoid valve device includes a nozzle made of a resin and a metal cover arranged to cover a lateral surface of the nozzle. A solenoid valve device according to an embodiment of the present invention may be of a normally high type, in which a valve body arranged in a nozzle normally leaves a valve open. Also, a valve body and a rod pin may be defined as one piece in a solenoid valve device according to another embodiment of the present invention.

While embodiments of the present invention have been described above, it is to be understood that variations and modifications will be apparent to those skilled in the art without departing from the scope and spirit of the present invention. The scope of the present invention, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A solenoid valve device comprising:
   a rod pin movable in an axial direction;
   a cylindrical core made of a magnetic material, and arranged around the rod pin to guide the rod pin;
   a bobbin made of a resin, and arranged to cover a side surface of the cylindrical core;
   a coil wound around the bobbin;
   a case having a bottom and being cylindrical, having an opening at one axial end thereof, and arranged to accommodate the rod pin, the cylindrical core, the bobbin, and the coil;
   a nozzle made of a resin, and attached to a case opening portion defined at the one axial end of the case;
   a first port and a second port each of which is defined in the nozzle;
   a valve body arranged in the nozzle, and driven by the rod pin to open or close a communication between the first and second ports; and
   a tubular metal cover arranged to cover a lateral surface of the nozzle such that the nozzle is directly fitted into the tubular metal cover;
   wherein the metal cover includes a recessed portion or a raised portion defined in an inner surface thereof, and a portion of the nozzle abuts against a portion of the metal cover through the recessed portion or the raised portion.

2. The solenoid valve device according to claim 1, wherein the metal cover is arranged to cover the entire lateral surface of the nozzle.

3. The solenoid valve device according to claim 1, wherein the metal cover is defined by an aluminum pipe.

4. The solenoid valve device according to claim 1, wherein the nozzle is fitted into an attachment hole defined in a control valve for attachment of a solenoid valve, and the metal cover is arranged to close a gap between a wall surface of the attachment hole for the attachment of the solenoid valve and an outer circumferential surface of the nozzle made of the resin.

5. The solenoid valve device according to claim 1, wherein at least one of the first and second ports is arranged to open in a side surface of the nozzle, the metal cover includes a cover opening portion defined at a position corresponding to a position of the port opening in the side surface of the nozzle, and a portion of the nozzle abuts against the cover opening portion.

6. The solenoid valve device according to claim 5, wherein the cover opening portion is larger than a portion of the port that opens in the side surface of the nozzle, and a surface of the nozzle is exposed between an inner edge of the cover opening portion and a periphery of the opening portion of the port such that the surface of the nozzle is flush with a surface of the metal cover.

7. The solenoid valve device according to claim 1, wherein
the nozzle includes a pin receiving portion in which the rod pin is inserted at one axial end thereof, and the first port is arranged at another axial end of the nozzle, the first port extending in the axial direction;
a valve member having the valve body accommodated therein is arranged in a valve seat provided between the pin receiving portion and the first port, and the second port is arranged to extend radially from the valve member to the side surface of the nozzle; and
a side surface of the metal cover includes an opening at a position corresponding to a position of the second port.

8. The solenoid valve device according to claim 7, wherein each of the pin receiving portion and the first port is arranged to decrease in a diameter from respective axial ends of the nozzle made of the resin toward an axial middle of the nozzle.

9. A solenoid valve device comprising:
a rod pin movable in an axial direction;
a cylindrical core made of a magnetic material, and arranged around the rod pin to guide the rod pin;
a bobbin made of a resin, and arranged to cover a side surface of the cylindrical core;
a coil wound around the bobbin;
a case having a bottom and being cylindrical, having an opening at one axial end thereof, and arranged to accommodate the rod pin, the cylindrical core, the bobbin, and the coil;
a nozzle made of a resin, and attached to a case opening portion defined at the one axial end of the case;
a first port and a second port each of which is defined in the nozzle;
a valve body arranged in the nozzle, and driven by the rod pin to open or close a communication between the first and second ports; and
a tubular metal cover arranged to cover a lateral surface of the nozzle such that the nozzle is directly fitted into the tubular metal cover;
wherein the nozzle includes a pin receiving portion in which the rod pin is inserted at one axial end thereof, and the first port is arranged at another axial end of the nozzle, the first port extending in the axial direction;
a valve member having the valve body accommodated therein is arranged in a valve seat provided between the pin receiving portion and the first port, and the second port is arranged to extend radially from the valve member to the side surface of the nozzle; and
a side surface of the metal cover includes an opening at a position corresponding to a position of the second port; and
wherein each of the pin receiving portion and the first port is arranged to decrease in a diameter from respective axial ends of the nozzle made of the resin toward an axial middle of the nozzle.

* * * * *